(12) United States Patent  (10) Patent No.: US 10,934,716 B2
Billings et al.  (45) Date of Patent: Mar. 2, 2021

(54) CONSTRUCTION UNDERPAYMENT

(71) Applicant: Velcro IP Holdings LLC, Manchester, NH (US)

(72) Inventors: Scott Billings, Manchester, NH (US); Paul M. Siemiesz, New Boston, NH (US); Andrew Collins, Bedford, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 16/132,521

(22) Filed: Sep. 17, 2018

(65) Prior Publication Data
US 2020/0087917 A1 Mar. 19, 2020

(51) Int. Cl.
*E04B 1/00* (2006.01)
*E04D 12/00* (2006.01)
*E04D 11/02* (2006.01)
*E04G 21/24* (2006.01)

(52) U.S. Cl.
CPC ............ *E04D 12/002* (2013.01); *E04D 11/02* (2013.01); *B32B 2419/06* (2013.01); *E04G 2021/248* (2013.01)

(58) Field of Classification Search
None
See application file for complete search history.

(56) References Cited

U.S. PATENT DOCUMENTS

| | | | |
|---|---|---|---|
| 3,135,820 A | 6/1964 | Hallett et al. | |
| 3,389,518 A | 6/1968 | Horbach | |
| 3,458,609 A | 7/1969 | Smith et al. | |
| 3,658,107 A | 4/1972 | Perina | |
| 3,851,357 A | 12/1974 | Ribich et al. | |
| 3,895,797 A | 7/1975 | Moore | |
| 3,905,071 A | 9/1975 | Brumlik | |
| 3,909,998 A | 10/1975 | Simpson et al. | |
| 3,946,944 A | 3/1976 | Keyes et al. | |
| 3,971,184 A | 7/1976 | Van Wagoner | |
| 4,032,689 A | 6/1977 | Johnson et al. | |
| 4,037,296 A | 7/1977 | White et al. | |
| 4,065,899 A | 1/1978 | Kirkhuff | |

(Continued)

FOREIGN PATENT DOCUMENTS

DE 2263375 7/1974
DE 4100902 2/1990

(Continued)

OTHER PUBLICATIONS

Application No. 2,720,797; Canadian Office Action dated Feb. 27, 2012; 5 pages.

(Continued)

*Primary Examiner* — Basil S Katcheves (74) *Attorney, Agent, or Firm* — Fish & Richardson P.C.

(57) ABSTRACT

Rigid foam-core construction underlayment is formed to have one broad side covered by a flexible substrate that carries a series of spaced-apart, discrete regions (such as islands or spaced lanes) of resin, each resin region carrying a respective field of male touch fastener elements extending away from the substrate and exposed for engagement, such as by fibers on an inner surface of exterior construction material, such as a roofing membrane.

8 Claims, 11 Drawing Sheets

(56) References Cited

U.S. PATENT DOCUMENTS

| | | |
|---|---|---|
| 4,182,406 A | 1/1980 | Holbrook |
| 4,242,409 A | 12/1980 | Parker |
| 4,279,958 A | 7/1981 | Ahmad |
| 4,312,822 A | 1/1982 | Bonnet |
| 4,346,541 A | 8/1982 | Schmitt |
| 4,361,993 A | 12/1982 | Simpson |
| 4,450,663 A | 5/1984 | Watkins |
| 4,492,064 A | 1/1985 | Bynoe |
| 4,513,548 A | 4/1985 | Parker |
| 4,572,435 A | 2/1986 | Thompson |
| 4,572,865 A | 2/1986 | Gluck |
| 4,581,186 A | 4/1986 | Larson |
| 4,651,489 A | 3/1987 | Hodges et al. |
| 4,736,561 A | 4/1988 | Lehr et al. |
| 4,738,884 A | 4/1988 | Algrim et al. |
| 4,770,292 A | 9/1988 | Handler |
| 4,774,794 A | 10/1988 | Grieb |
| 4,855,172 A | 8/1989 | Chiu |
| 4,864,788 A | 9/1989 | Tippmann |
| 4,894,060 A | 1/1990 | Nestegard |
| 4,928,575 A | 5/1990 | Smirlock et al. |
| 4,930,285 A | 6/1990 | Ward |
| 4,996,812 A | 3/1991 | Venable |
| 5,035,028 A | 7/1991 | Lemke |
| 5,058,245 A | 10/1991 | Saito |
| 5,058,247 A | 10/1991 | Thomas et al. |
| 5,060,443 A | 10/1991 | Pacione |
| 5,095,673 A | 3/1992 | Ward |
| 5,116,439 A | 5/1992 | Raus |
| 5,124,366 A | 6/1992 | Gluck et al. |
| 5,170,690 A | 12/1992 | Smirlock et al. |
| 5,177,922 A | 1/1993 | Ovaert et al. |
| 5,239,802 A | 8/1993 | Robinson |
| 5,282,616 A | 2/1994 | Stacavich-Nataro |
| 5,302,001 A | 4/1994 | van Dis |
| 5,311,716 A | 5/1994 | Houssin |
| 5,382,462 A * | 1/1995 | Pacione .................. A44B 18/00 428/100 |
| 5,384,939 A | 1/1995 | Weber |
| 5,505,747 A | 4/1996 | Chesley et al. |
| 5,518,795 A | 5/1996 | Kennedy |
| 5,537,793 A | 7/1996 | Murasaki |
| 5,579,619 A | 12/1996 | Godschalx |
| 5,580,638 A | 12/1996 | Kiser |
| 5,665,286 A | 9/1997 | Sulzbach et al. |
| D390,099 S | 2/1998 | Bailey et al. |
| 5,746,027 A | 5/1998 | Bonerb |
| 5,829,214 A | 11/1998 | Hart |
| 5,900,350 A | 5/1999 | Provost et al. |
| 5,985,391 A | 11/1999 | Denehy et al. |
| 6,006,482 A | 12/1999 | Kelly |
| 6,035,498 A * | 3/2000 | Buzzell .............. A44B 18/0003 24/442 |
| 6,092,344 A | 7/2000 | Kelly |
| 6,131,353 A | 10/2000 | Egan |
| 6,238,502 B1 | 5/2001 | Hubbard |
| 6,256,957 B1 | 7/2001 | Kelly |
| 6,287,665 B1 | 9/2001 | Hammer |
| 6,298,624 B1 | 10/2001 | Pacione |
| 6,306,477 B1 * | 10/2001 | Pacione ............ A47G 27/0293 428/62 |
| 6,314,700 B2 | 11/2001 | Starr |
| 6,367,218 B2 * | 4/2002 | Lombardo ................ B44C 1/28 52/311.2 |
| 6,372,176 B1 | 4/2002 | Ekendahl et al. |
| 6,401,426 B1 | 6/2002 | Alderman et al. |
| 6,421,980 B1 | 7/2002 | Alderman et al. |
| 6,460,303 B1 | 10/2002 | Pacione |
| 6,540,863 B2 | 4/2003 | Kenney et al. |
| 6,666,638 B2 | 12/2003 | Craven |
| 6,679,018 B2 | 1/2004 | Georgeau et al. |
| 6,689,449 B2 | 2/2004 | Hasan et al. |
| 6,742,313 B2 | 6/2004 | Ritland et al. |
| 6,773,780 B2 | 8/2004 | Flutter |
| 6,804,922 B1 | 10/2004 | Egan |
| 6,852,185 B2 | 2/2005 | Sanger |
| 6,938,386 B2 | 9/2005 | Ritland et al. |
| 7,056,462 B2 | 6/2006 | Provost et al. |
| 7,141,283 B2 | 11/2006 | Janzen et al. |
| 7,159,921 B2 | 1/2007 | Billarant et al. |
| 7,160,600 B2 * | 1/2007 | Shepard ............ A44B 18/0011 428/99 |
| 7,168,221 B2 | 1/2007 | Hunter, Jr. |
| 7,172,008 B2 * | 2/2007 | Vanbenschoten .. A44B 18/0049 156/244.22 |
| 7,412,806 B2 * | 8/2008 | Pacione .................. E04F 15/02 52/311.2 |
| 7,622,187 B2 | 11/2009 | Clarke et al. |
| 7,765,756 B2 | 8/2010 | Bontrager |
| 8,051,540 B2 | 11/2011 | Gallant et al. |
| 8,082,696 B2 * | 12/2011 | Oliver ...................... B32B 3/04 267/142 |
| 8,322,101 B2 | 12/2012 | Kelly |
| 8,562,769 B2 | 10/2013 | Kraus et al. |
| 9,140,017 B1 * | 9/2015 | Oliver .................. E04F 13/075 |
| 9,637,926 B2 | 5/2017 | Kraus et al. |
| 9,752,326 B2 | 9/2017 | Kraus et al. |
| 9,963,880 B2 | 5/2018 | Kraus et al. |
| 2003/0029110 A1 | 2/2003 | Pacione |
| 2003/0070391 A1 * | 4/2003 | Tachauer ............ A44B 18/0049 52/745.21 |
| 2004/0068952 A1 | 4/2004 | Pacione |
| 2004/0144043 A1 | 7/2004 | Stevenson |
| 2004/0157036 A1 | 8/2004 | Provost et al. |
| 2005/0081342 A1 | 4/2005 | Erickson et al. |
| 2005/0196580 A1 | 9/2005 | Provost et al. |
| 2006/0110572 A1 * | 5/2006 | Herrero ............. A44B 18/0049 428/100 |
| 2006/0123727 A1 | 6/2006 | Akins et al. |
| 2007/0193168 A1 | 8/2007 | Fritz |
| 2007/0220823 A1 | 9/2007 | Akins et al. |
| 2007/0264482 A1 | 11/2007 | Banker et al. |
| 2008/0083183 A1 | 4/2008 | Rymell et al. |
| 2008/0245404 A1 | 10/2008 | DeLiddo |
| 2013/0001820 A1 | 1/2013 | Kraus et al. |
| 2013/0008113 A1 * | 1/2013 | Kraus, Jr. ............... B29C 39/18 52/410 |
| 2013/0139471 A1 | 6/2013 | Paradis et al. |
| 2013/0280474 A1 | 10/2013 | Medina et al. |
| 2017/0129160 A1 * | 5/2017 | McRoskey ............ B29C 53/063 |

FOREIGN PATENT DOCUMENTS

| | | |
|---|---|---|
| DE | 4206205 | 8/1993 |
| DE | 19752819 | 6/1999 |
| EP | 0146012 | 6/1985 |
| EP | 0325528 | 7/1989 |
| EP | 1795654 | 6/2007 |
| EP | 1953306 | 12/2010 |
| JP | H08183082 | 7/1996 |
| JP | 3056828 B2 | 6/2000 |
| WO | WO9836139 | 8/1998 |
| WO | WO9954420 | 10/1999 |
| WO | WO0043608 | 7/2000 |
| WO | WO0181771 | 11/2001 |
| WO | WO 02/096233 | 12/2002 |
| WO | WO2009025650 | 2/2009 |

OTHER PUBLICATIONS

Application No. EP 09731047.8; European Office Action of European Patent Application No. 09 731 047.8 dated Dec. 27, 2011, 5 pages.

Application No. EP 09731047.8; European Office Action of European Patent Application No. 09 731 047.8 dated Sep. 13, 2012, 5 pages.

Application No. EP 13182030.0; European EP Communication dated May 15, 2014; 5 pages.

Application No. EP 13182030.0; European search report dated Oct. 16, 2013, 59 pages.

Application No. PCT/US2009/040003; International Search Report and Written Opinion dated Jul. 7, 2009, 15 pages.

(56) References Cited

OTHER PUBLICATIONS

Application No. 200980121412.8; Chinese Office Action dated May 23, 2012; 5 pages.
Application No. PCT/US2009/040003; International Preliminary Report on Patentability and Written Opinion dated Oct. 21, 2010; 9 pages.
Application No. PCT/EP2019/074779; International Search Report and Written Opinion, datled Nov. 28, 2019; 15 pages.

* cited by examiner

CONSTRUCTION UNDERPAYMENT

TECHNICAL FIELD

This invention relates to securing exterior building construction materials, such as roof membranes and siding that are exposed to environmental forces such as wind and rain, and to methods of making underlayment to secure such materials.

BACKGROUND

Some buildings have roofs that are shingled. Some others have membrane roofs, in which a flexible membrane forms the outer environmental barrier. Many membrane roofs are flat or slightly sloped or arched. In general, roofing membranes are secured over rigid insulation boards, such as foam boards, that increase the thermal barrier properties of the roof.

Membrane roofs, like other roofs, must withstand severe environmental conditions, including high winds and hail. Winds can cause large pressure differentials across the roof membrane, and can actually lift or separate the membrane from the roof.

Wind uplift occurs when the air pressure below the roof system is greater than that above the system as wind flows over the building decreasing the pressure directly above the roof surface. The atmospheric pressure below the roof attempts to equalize this pressure differential, causing an upward push of air referred to as wind uplift.

New roofing constructions and methods are sought to provide cost-effective installation and satisfactory uplift load resistance, while preventing the warping of foam boards that can be caused when reinforcing the boards.

SUMMARY

One aspect of the invention features a method of forming construction underlayment. The method includes introducing a longitudinally continuous facing into a molding channel. The facing includes a flexible sheet-form substrate and a series of spaced-apart, discrete regions of resin secured to and disposed on the substrate. Each region carries a respective field of male touch fastener elements extending away from the substrate toward a surface of the molding channel. The method includes introducing liquid resin to the molding channel. The liquid resin contains a foaming agent that causes the liquid resin to foam to expand within the molding channel on a back side of the substrate, such that the foamed resin bonds to the substrate. The method includes solidifying the foamed resin to form a resin board with the spaced-apart regions of resin exposed on a face of the board.

In some examples, each region is a continuous lane of resin, where the series of discrete regions include parallel lanes of resin defining longitudinally continuous gaps therebetween. In some cases, the lanes extend along an entire length of the board. In some examples, each lane is bounded by adjacent gaps that are narrower than the lane.

In some implementations, each region is an island of resin spaced from all adjacent islands of resin.

In some embodiments, each region includes a resin base layer and the touch fastener elements of each region have individual resin stems extending integrally from a surface of the resin base layer. In some examples, the resin base layer includes two resin layers, where a first layer of the two resin layers is disposed on a side of the resin base layer opposite the fastener elements and has a melting temperature that is lower than a melting temperature of a second layer of the two resin layers.

In some cases, the substrate forms a facing of the resin board, with exposed regions of substrate between the regions of resin.

In most implementations, the substrate includes a sheet of paper underlying all of the resin regions. In some cases, the substrate includes fiberglass-reinforced paper. In some examples, the substrate further includes a tie layer on a side of the sheet of paper opposite the discrete regions of resin, and introducing the liquid resin causes the liquid resin to bond to the tie layer. In some examples, the tie layer includes a layer of resin that softens during foaming of the liquid resin, and then solidifies as the foamed resin solidifies.

Still in other implementations, the substrate is porous, and introducing liquid resin causes the introduced resin to flow into pores of the substrate. In some cases, the substrate includes a non-woven fabric.

In some examples, the liquid resin is introduced as parallel lanes of resin that expand to form a single contiguous foam structure having corresponding knit lines, with the substrate spanning multiple knit lines.

In some embodiments, the method further includes introducing a carrier sheet to the molding channel, with the liquid resin disposed between the carrier sheet and the substrate, such that the carrier sheet forms an opposite surface of the resin board.

Another aspect of the invention includes a construction underlayment that includes a rigid foam board that has two broadest sides that define a thickness therebetween. The construction underlayment also includes a facing that includes a flexible substrate bonded across one of the broadest board sides. The underlayment carries a series of spaced-apart, discrete regions of resin that extend from the foam board, and each resin region carries a respective field of male touch fastener elements that extend away from the substrate and that are exposed for engagement.

In some cases, each region is a continuous lane of resin, the series of discrete regions including parallel lanes of resin defining longitudinally continuous gaps therebetween. In some examples, each lane defines multiple bend points spaced-apart along its length, at which bend points the lane has a lower resistance to bending than at points between the bend points. In some instances, each lane is of lesser thickness at the bend points than between the bend points.

In some examples, each region is an island of resin spaced from all adjacent islands of resin. In some examples, the islands of resin are arranged in a repeating pattern of rows and columns of islands. In some cases, the columns are staggered such that islands of adjacent rows are not aligned. In some implementations, the islands are arranged to preclude any straight inter-island gap extending across an entire width of the board. In most cases, the islands are arranged to preclude any straight inter-island gap extending across an entire extent of the board in any direction.

In some implementations, the islands are of an oval shape.

In most embodiments, the board is of an overall length and width, both greater than an overall thickness of the board, the length being greater than the thickness, and the islands are each of greater extent along the length of the board than along the width of the board.

In some cases, the resin of each region is mechanically secured to the substrate by portions of the resin encapsulating surface features of the substrate.

In some instances, the resin of each region is bonded to the substrate by an adhesive layer between the resin and the substrate.

In some examples, the fields of male touch fastener elements carried by the regions together cover between 75 and 99 percent of a total area of the facing. In some cases, the fields of male touch fastener elements carried by the regions together cover between 85 and 95 percent of a total area of the facing.

In most cases, each region includes a resin base layer and the touch fastener elements of each region have individual resin stems extending integrally from a surface of the resin base layer.

In some embodiments, each base layer has an overall thickness, in a direction extending away from the foam board, less than about two percent of an overall thickness of the foam board.

Still another aspect of the invention features a method of roofing a structure. The method includes securing construction underlayment over an area of the structure to be roofed. The construction underlayment includes foam boards of discrete length and width, with each board having a facing that includes a flexible substrate bonded across one of the broadest board sides and that carries a series of spaced-apart, discrete regions of resin extending from the foam board. Each resin region carries a respective field of male touch fastener elements that extend away from the substrate and that are exposed for engagement with the board secured. The method further includes positioning a flexible roofing membrane over the secured underlayment. The membrane has an inner side with exposed fibers configured to be snagged by the male fastener elements of the discrete regions of resin to hold the roofing membrane on the underlayment, with the membrane unsecured in areas between the regions of resin.

Features of the invention allow a foam board to be made having a facing that carries resin regions with fastener elements, without causing the foam board to warp or bend. Gaps and bend points between and along resin regions help prevent the foam board from warping in either direction of the board.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
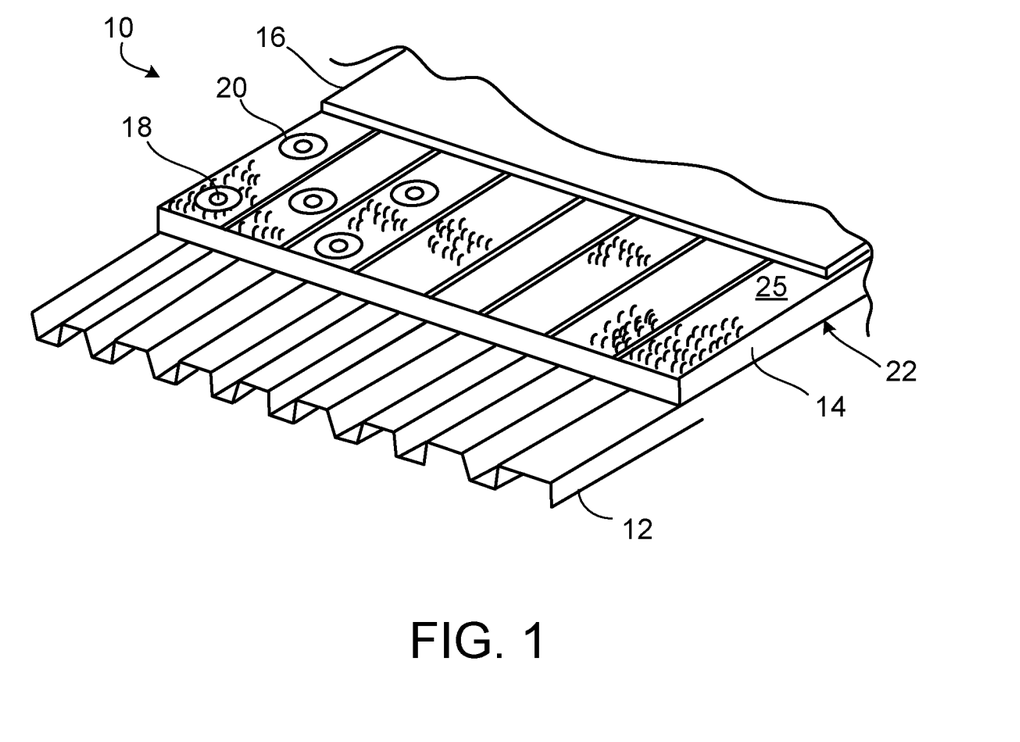
FIG. 1 is a perspective view of a partially constructed membrane roof.
Figure 2:
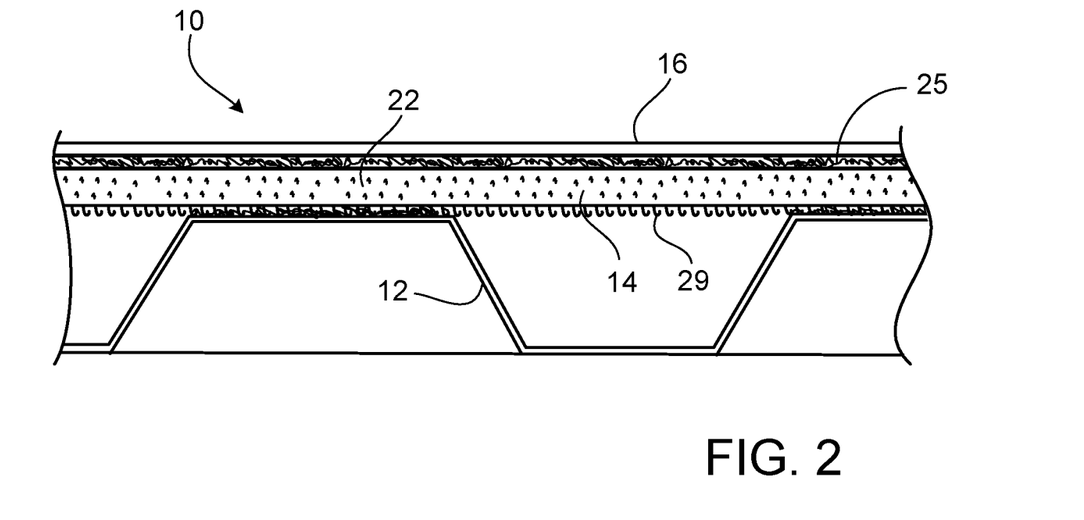
FIG. 2 is a cross-section view of the completed membrane roof.

Referring first to FIGS. 1 and 2, a roof 10, such as of a house or commercial structure, includes a structural roof deck 12 to which rigid insulation 14 is secured. A roofing membrane 16 is then secured over the rigid insulation as an environmental barrier. Rigid insulation 14 carries discrete regions 25 (e.g., lanes) of resin on one broad side with hooks that are engageable with a fastening surface of roof membrane 16. The roof deck 12 may be fashioned of corrugated metal sheet as shown, or of wood, concrete, cementitious wood fiber (e.g., Tectum™), lightweight concrete and lightweight insulating concrete and/or structural beams, for example, and it provides a supporting surface for the roof. The rigid insulation 14 is made up of several rigid foam boards 22 placed edge to edge across the roof deck to form an underlayment that serves as a thermal barrier. Each rigid board 22 has two broad sides that define a thickness therebetween. For each rigid board, its overall length and width are both greater than an overall thickness of the board. Typical board sizes are 4 ft×8 ft (1.2×2.4 meters) or 2 ft×4 ft (0.6×1.2 meters), 4 ft×4 ft (1.2×1.2 meters) and 2 ft×8 (0.6×2.4 meters). The thickness of the foam board can range from about 0.25 in to about 8 in (0.635-20.32 cm), in some cases between 1.5 and 2.0 inches (37 to 50 mm), for example, and may be stacked for increased thickness or insulation or tapered for improved drainage. Touch fasteners may also be used to bond stacked layers. Board thickness may also be varied, for example, to produce a tapered panel for improved watershed, drainage or insulation capacity. In these examples, the rigid boards are formed primarily of foam, with upper and/or lower skins of materials to be discussed below. The membrane 16 may be of EPDM, PVC, TPO or other resin, or modified bitumen membrane, for example, and provides an outer roof surface that resists water intrusion and protects the roof from environmental damage.

Figure 3:
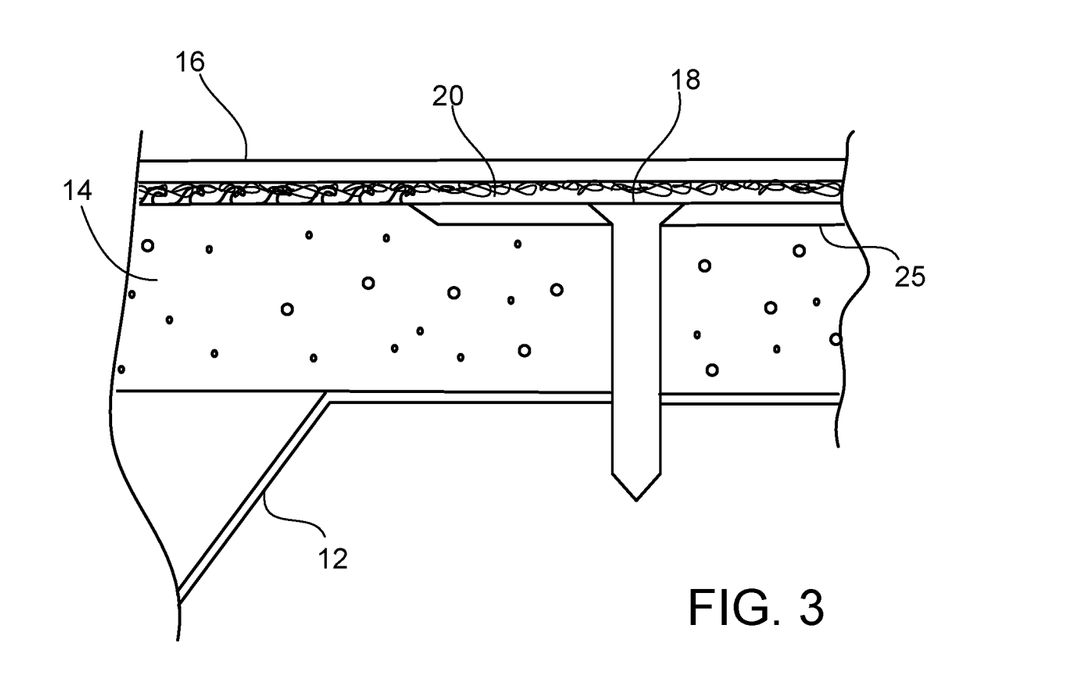
FIG. 3 is an enlarged cross-sectional view of the roof, showing a roofing underlayment fastener.

The insulation 14 may be secured to the roof deck 12 by threaded single-type fasteners 18 and load distribution washers 20, as shown in FIGS. 1 and 3, or by touch fasteners (e.g., hook-and-loop fasteners), as shown in FIG. 2 and discussed further below. Alternatively or additionally, battens may also be used in combination with the mechanical fastening systems described herein. If by threaded fasteners, the fasteners may be of 0.168 inch (4.3 mm) shank diameter and arranged in any pattern known in the art, and typically include washers 20 of about two to three inch (51-75 mm) diameter to distribute the fastening load through the foam.

Single-type fasteners 18 are installed in a pattern with washers 20 installed thereon to provide increased stress distribution. Fasteners 18 can be selected to penetrate the roofing structures to a desired depth. Portions of membrane 16 can be reinforced as predetermined locations for fasteners 18, reducing the number or size of fasteners 18 or washers 20. Any type, number, size and pattern of fasteners 18 and washers 20 can be (a) installed under membrane 16; (b) installed through membrane 16 and sealed (i.e., piercing membrane 16); (c) installed within the lap of overlapping portions of membrane 16; or (d) applied under membrane 16 with an integral fastener above (e.g., non-piercing types). Suitable washers and threaded fasteners are available from Trufast, LLC of Bryan, Ohio under the product names MP-3 Plates and DP Fasteners.

Figure 4:
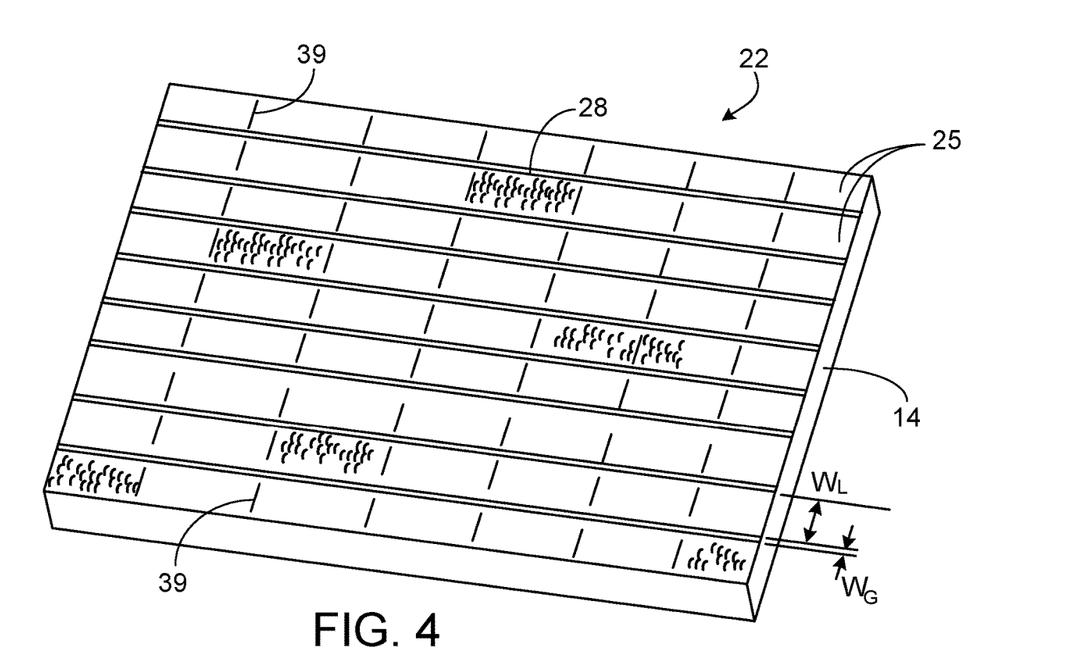
FIG. 4 is a perspective view of one of the rigid foam underlayment boards of the roof of FIG. 1.
Figure 5:
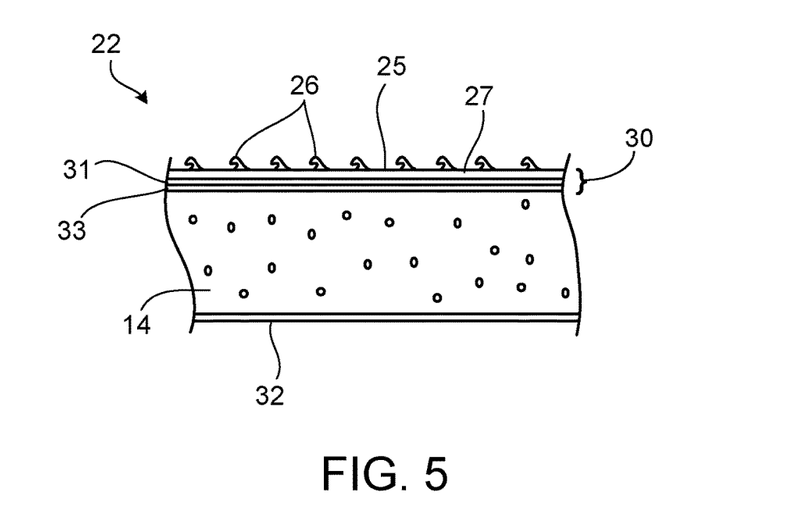
FIG. 5 is a cross-sectional view of an underlayment board having resin lanes carried on a paper as a facing on one side and a paper facing on the other side.

Referring next to FIGS. 4 and 5, board 22 of rigid foam insulation 14 is a rectangular structure having a length, width, and a thickness substantially less than the width or length of the board. Notably, board 22 has discrete regions of resin extending from the board. In this example, the discrete regions are continuous lanes 25 of resin that are parallel to one another and define longitudinally continuous gaps 28 between each lane. Each lane 25 is bounded by adjacent gaps 28 that are narrower than the lane 25. Each gap 28 may have a width '$w_G$' of about 0.125 inch (3.175 mm) and each lane 25 has a width '$w_L$' of about 1.25 inches (31.75 mm). Such dimensions may change, with the width of the gaps being generally one tenth of the width of the lanes. In some cases, the gap is as large as about one fifth of the width of the lanes. Lanes 25 can extend along an entire length of the board or can extend along a portion of the length. Preferably, the fields of male touch fastener elements carried by the resin lanes 25 together cover between 75 and 99 percent of a total area of the insulation board. In some cases, the fields of fastener elements cover between 85 and 95 percent of a total area of the insulation board. While illustrated for simplicity with fastener elements in only some regions of the lanes, it will be understood that each lane 25 is essentially covered with its array of fastener elements. As shown in FIG. 4 and as further discussed in detail with respect to FIG. 6, each lane has multiple bend points or skive off points 39 spaced-apart along its length, at which bend points the lane has a lower resistance to bending or skiving off than at points between the bend points. Each resin lane carries a respective field of male touch fastener elements that extend away from the resin lane and that are exposed for engagement. The fastener elements 26 have stems formed integrally with the resin that forms the lanes. The fastener elements may be hook-shaped, as shown in FIG. 5, or mushroom-shaped, for example. Other fastener element shapes may be substituted, depending on the application. In this example, the fastener elements are of a CFM-29 shape, available from Velcro USA, Inc. of Manchester, N.H., and described in U.S. Pat. No. 5,900,350, the entire contents of which are hereby incorporated by reference. Other methods of forming fastener elements are disclosed in U.S. Pat. Nos. 5,505,747, 4,894,060 and 5,058,247, each of which are also incorporated herein in their entirety. In some cases, fastener elements are 108 hooks, also available from Velcro USA, Inc.

As shown in FIG. 5, foam board 22 includes a thick layer of foam insulation 14 that has a paper skin 32 on a side opposite the resin lanes 25, and a facing 30 on the other side. Facing 30 includes a flexible sheet-form substrate such as a fiberglass-reinforced paper 31 and a layer of resin 27 (e.g., resin lanes 25) secured to and disposed on the substrate 31. In other words, substrate 31 is bonded across one broad side of the board and it carries the series of spaced-apart, discrete resin lanes 25 extending from the foam board 22. Flexible substrate 31 may be a porous substrate and in some cases, it can be a non-woven fabric. In some examples, substrate 31 includes a textile such as a woven or knitted fabric. As shown in FIG. 4, substrate 31 underlies all of the resin lanes 25, having exposed regions of substrate 31 between each lane. In cases where substrate 31 includes a sheet of paper, for example, the substrate can further include a tie layer 33 on a side of the sheet of paper opposite the discrete regions of resin 25. As further described in detail with respect to FIG. 12, tie layer 33 directly contacts foam insulation 14 and can be a layer of resin that softens during foaming of the foam insulation (e.g., liquid resin) during the manufacturing process.

Resin lanes 25 include a resin base layer 27 from which the touch fastener elements 26 integrally extend. Each base layer 27 has an overall thickness, in a direction extending away from the foam board that is less than about two percent of an overall thickness of the foam board. Touch fastener elements 26 are exposed to engage hook-engageable features (e.g., fibrous loops) of a roofing membrane. For example, when roofing a structure, a construction underlayment formed by multiple boards 22 can be first secured to the roof deck (shown in FIG. 1), and then a roofing membrane can be positioned over the boards 22 such that the exposed fibers on the inner side of the membrane are snagged by fastener elements 26, with the membrane remaining unsecured or unengaged in areas between the resin lanes 25.

Figure 6:
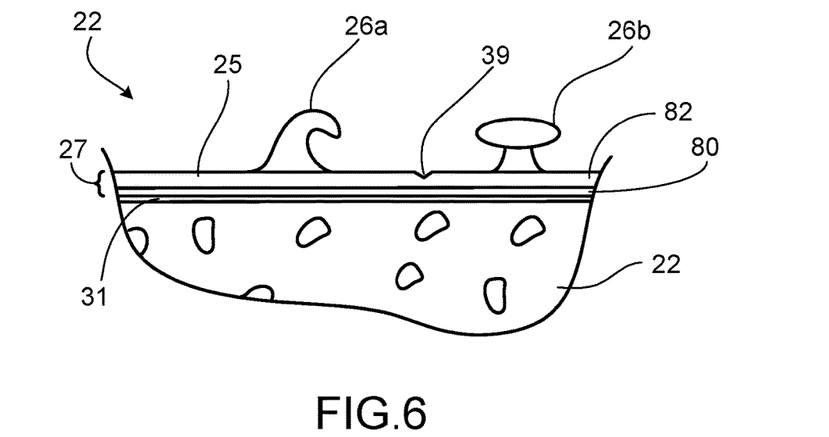
FIG. 6 is an enlarged cross-sectional view showing a bend point of a resin lane.

Referring now to FIGS. 6 and 4, each resin lane 25 has multiple bend points or skive off points 39 along the length of the resin lane. Bend points can be aligned with adjacent bend points of neighboring lanes, or can be staggered. Bend points 39 can be v-grooves that extend laterally along the width of the resin lane 25. Each resin lane is of lesser thickness at the bend points than a thickness of the lane between the bend points. Bend points 39 may be formed after lamination of the resin lanes onto the carrier substrate 31, by cutting across the lanes after the resin has solidified, or can be formed when the lanes are formed (such as by molding indentations in the lanes). Bend points 39 and the gaps between the resin lanes 25 help prevent foam board 22 from warping in either direction of the board during foam curing. For example, as shown in FIG. 4, when a large area of the board is covered by a resin base, significant shrinkage of the resin, such as can occur in heater 54 (shown in FIG. 12), in shipping or as installed, can result in undesirable board warpage. To prevent the foam board from warping along its width, gaps 28 without resin are formed between resin lanes to minimize the stress along the width of the board associated with long areas of uninterrupted resin adhered to the board. In other words, instead of laminating a continuous resin base across an entirety of the foam surface, lanes 25 are formed separated from one another to 'break' the cross-machine direction 'backbone' of the resin base to reduce the stress in the cross-machine direction of the board. To prevent the foam board from warping along its length, each resin lane 25 has multiple bend points 39 along the length of the lanes 25 to reduce the stress associated with long areas of resin having uniform thickness adhered to the board. Other ways of creating bend points along the length of the resin lanes 25 include cutting and stretching, laser scoring, kiss cutting, and pattern sanding to reduce the mass or thickness at selected points of the lanes. The width of lanes 25 and gaps 28, and the distance between bend points 39 along respective lanes are sized to allow the foam board to keep its original shape as the resin shrinks (or as the foam expands). Thus, by covering a large area of a side of the foam board 22, the resin lanes 25, with their hooking elements, may form a broad but flexible attachment surface across the board 22, while avoiding undesirable warpage. This provides a means of uniformly securing the roof membrane to the board, while at the same time increasing the ability of the board to withstand uplift loads applied, for example, by extreme winds.

Still referring to FIG. 6, another solution for preventing the foam board from warping includes coextruding two different resins 80 and 82 to form a resin base 27 made of two bonded layers. The first layer 80 of resin can be a low-temperature thermoplastic (e.g., thermoplastic polyurethane) with a lower melting or activation temperature than the second layer 82 of resin. The second layer 82 can be made of polypropylene. Such properties can allow the first layer 80 of resin to bond or fuse to the foam board (e.g., to the substrate facing 31 of the foam board) at a relatively low temperature, which can significantly reduce the thermal shrinkage of first layer 80. Such shrinkage can be negligible, allowing the resin 27 to bond to the foam board 22 without causing the board to bend when the resin layer 80 solidifies. In some cases, the coextruded resin can form a continuous layer of resin (e.g., without resin lanes or resin islands) and still prevent the foam board from warping.

As shown in FIG. 6, each resin lane can have different types of fastener elements, such as J-shape hooks 26a and mushroom-type hooks 26b. In some examples, the hooks of resin lanes 25 are preferably configured with sufficient column strength, hook density and height to resist crushing from foot traffic, installation or other forces. Increased lateral column strength may be provided by shorter, thicker, and more closely arranged hooks believed to be desirable in certain high traffic or heavy load applications. A short mushroom-style hook is believed to be well suited to such applications. An example of a mushroom-style hook is the HTH 506 from Velcro USA Inc. or the 3M brand SJ3506 hook product.

In one example, resin lanes 25 are formed of polypropylene, and have a hook density of about 1700 hooks per square inch (265 per square cm). The hooks themselves may extend about 0.015 inches (0.381 mm) from the surface of the resin base 27. The resin base 27 of lanes 25 may have a thickness of about 0.005 inches (0.127 mm) as measured from a surface of the foam board. These relatively shorter, sturdier hooks and high hook densities are considered advantageous in avoiding damage from foot traffic during roof construction, particularly before the roof membrane is installed.

To further increase the reinforcement properties of the resin regions, washers with fasteners, fasteners of symmetric machine direction configuration, and different configurations of the hooks and loops can be used. Such methods and configurations are disclosed in U.S. Pat. No. 8,562,769, the entire contents of which are hereby incorporated by reference.

Referring back to FIG. 2, the side of insulation board 22 opposite resin lanes 25 may also be provided with touch fasteners 29, for securing the board to the roof deck. These board-deck touch fasteners 29 may be of a different shape, density and material than those of lanes 25, and may be arranged to either cover the entire (or substantially entire) surface to provide additional reinforcement, or arranged in spaced-apart strips (not shown). Such strips may be provided only where the board will engage upper lands of a corrugated roof deck, for example. Securing the insulation boards to the roof deck with touch fasteners eliminates holes, fastener corrosion and pull out failure modes. Alternatively or additionally, in some installations, hot asphalt or adhesives such as urethane can be used to secure the foam boards to the roof deck structure.

In some implementations, a combination of touch fasteners and adhesive can be used to secure the roofing membrane to the foam boards. For example, in any of the touch fastener configurations disclosed herein, an adhesive can be applied between the touch fastener materials in particular areas, such as at roofing corners and edges, to further secure the fastening against separation. In other cases, adhesive can substitute for touch fasteners in some regions.

Figure 7:
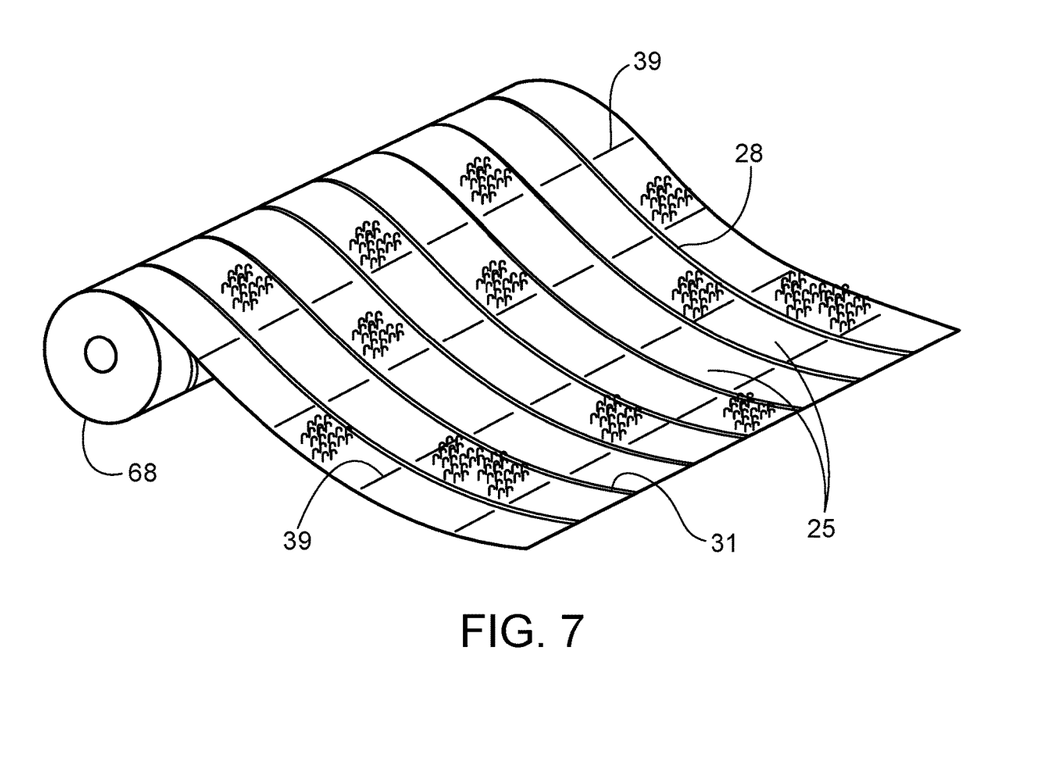
FIG. 7 is a perspective view of a paper carrying resin lanes, wound to form a roll.

Referring next to FIG. 7, substrate 31 carrying longitudinally continuous resin lanes 25 can be wound to form a roll 68. Roll 68 can be shipped and is ready for use in a foam board manufacturing apparatus, such as the one described in detail below with respect to FIG. 12. The substrate 31 can have a width that is about half the width of the foam board to which the substrate adheres. In some cases, resin lanes 25 can be formed on substrate 31 during the manufacturing process of the foam boards (e.g., simultaneously) instead of forming the lanes first and then forming the foam boards.

Figure 8A:
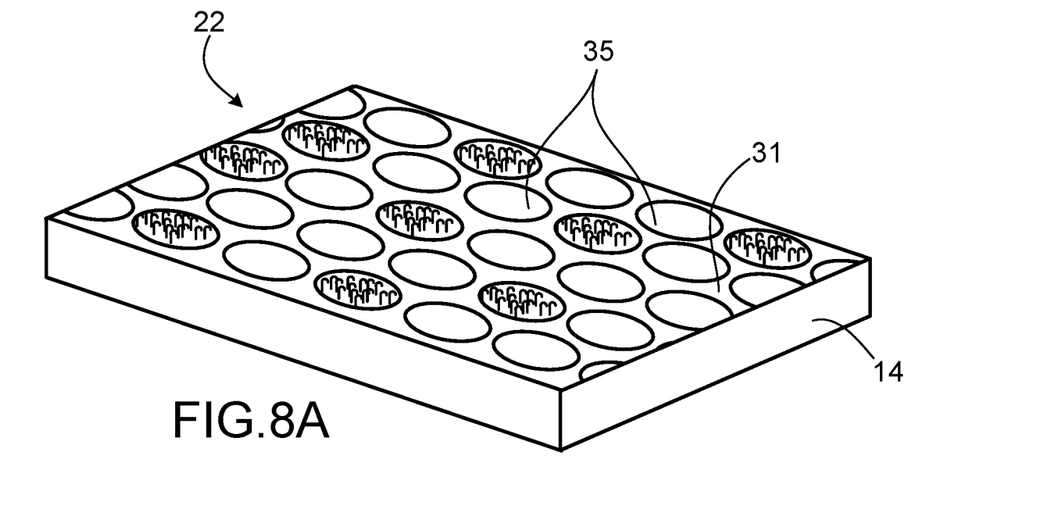
FIG. 8A is a perspective view of an underlayment board with a surface carrying discrete resin dots.
Figure 8B:
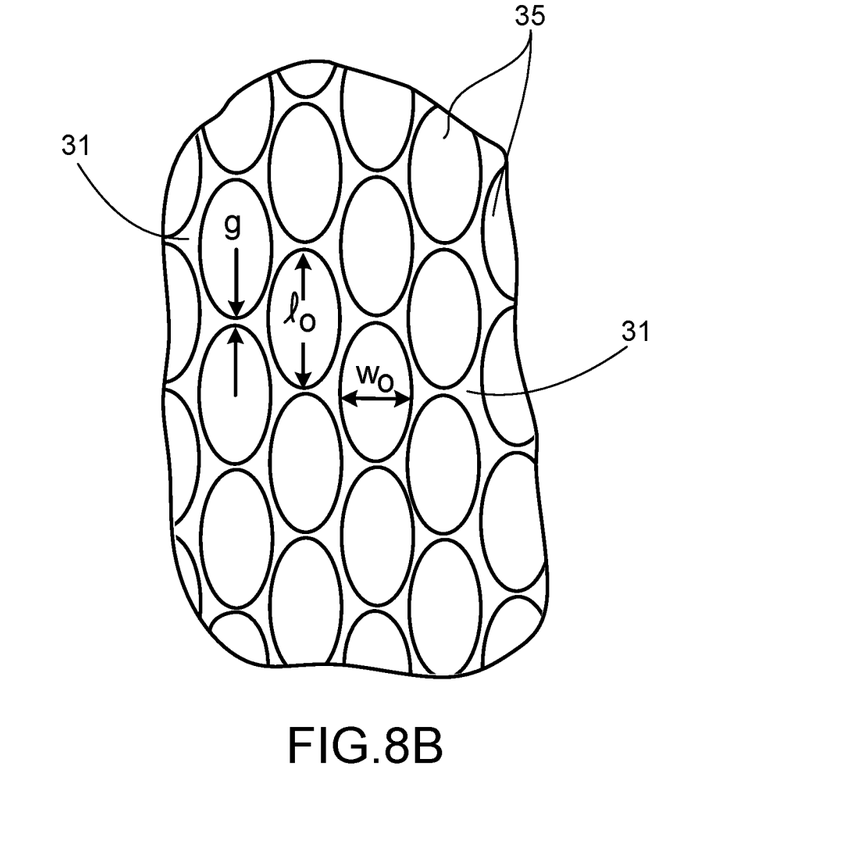
FIG. 8B is an enlarged plan view of the underlayment board of FIG. 8A, showing the arrangement of the resin dots.

Referring now to FIGS. 8A and 8B, the resin regions carried by substrate 31 can alternatively be in the form of resin islands or dots 35. As shown in FIG. 8A, foam board 22 is similar to the foam board of FIG. 4, with the exception of the resin regions being islands instead of continuous lanes. As shown in FIG. 8B, islands 35 are arranged in a repeating pattern of rows and columns of islands. Each island 35 of resin is spaced from all adjacent islands of resin. In this example, columns are staggered such that islands of adjacent rows are not aligned, to preclude any straight inter-island gap extending across an entire width of the board. In some cases, the islands 35 are arranged to preclude any straight inter-island gap extending across an entire extent of the board in any direction. Islands 35 can have an oval shape with a long axis (not shown) extending parallel to the length of the board. The islands are each of greater extent along the length of the board than along the width of the board. As adjacent columns of islands 35 are formed in a staggered configuration, alternating islands nest to cover about 90 percent of the surface of the board. While illustrated for simplicity with fastener elements in only some regions of the islands, it will be understood that each island 35 is essentially covered with its array of fastener elements. Islands 35 can be shaped as ovals having a width '$w_O$' of between 0.905-1.378 inches (23-35 mm) and a length '$l_O$' of between 1.535-1.653 inches (39-42 mm), for example. Gaps 'g' between the islands are between 0.039-0.118 inches (1-3 mm), for example.

Figure 9:
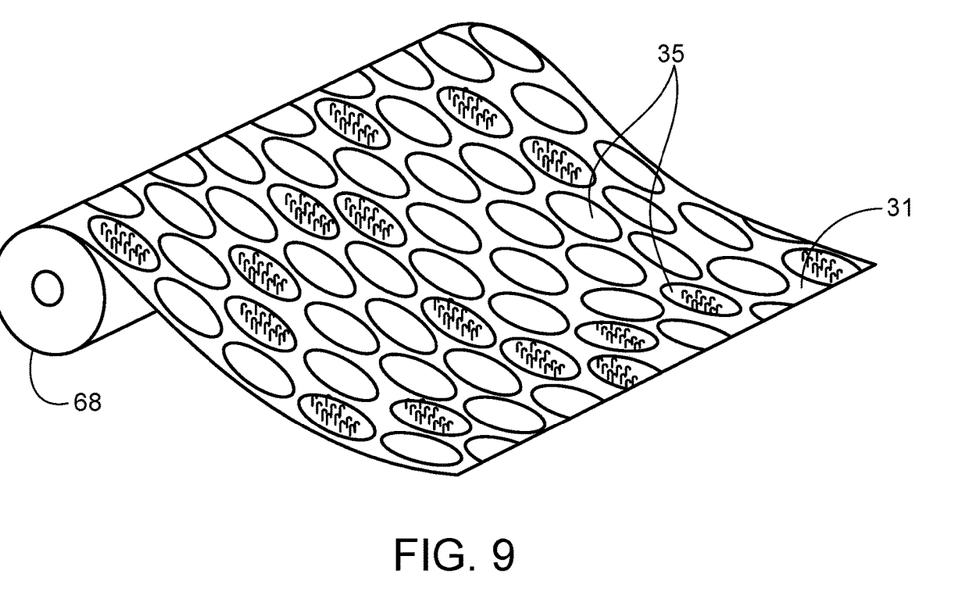
FIG. 9 is a perspective view of a paper carrying resin dots, wound to form a roll.

Referring to FIG. 9, a wound roll similar to the roll of FIG. 7 has resin dots or islands on one side of the flexible substrate 31. Roll 68 can be shipped and is ready for use in a foam board manufacturing apparatus, such as the one described in detail below with respect to FIG. 12. The substrate 31 has a width that is about half the width of the foam board to which the substrate adheres.

Figure 10:
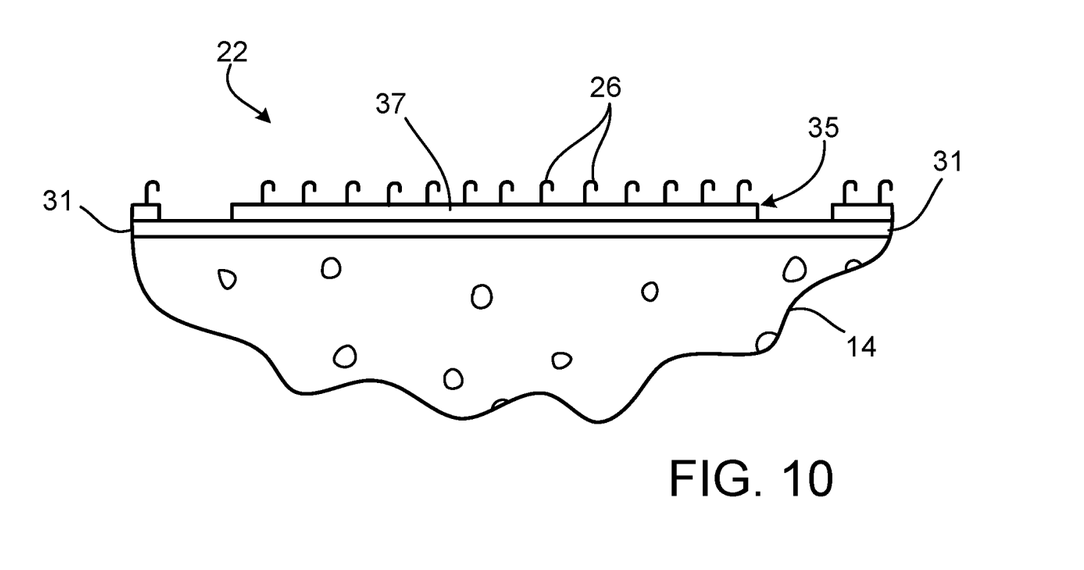
FIG. 10 is an enlarged cross-sectional view showing a resin dot.

Referring next to FIG. 10, the foam board of FIG. 8A has a substrate or paper skin facing 31 on one side, carrying discrete islands 35 that define thin resin bases 37 with fastener elements 26 extending therefrom. Facing 31 includes a flexible sheet-form substrate such as a fiberglass-reinforced paper. For simplicity purposes, only a portion of one column of resin islands 35 is shown. As shown in FIG.

8A, the substrate or paper facing underlies all of the islands 35, having exposed regions of paper between islands.

Figure 11A:
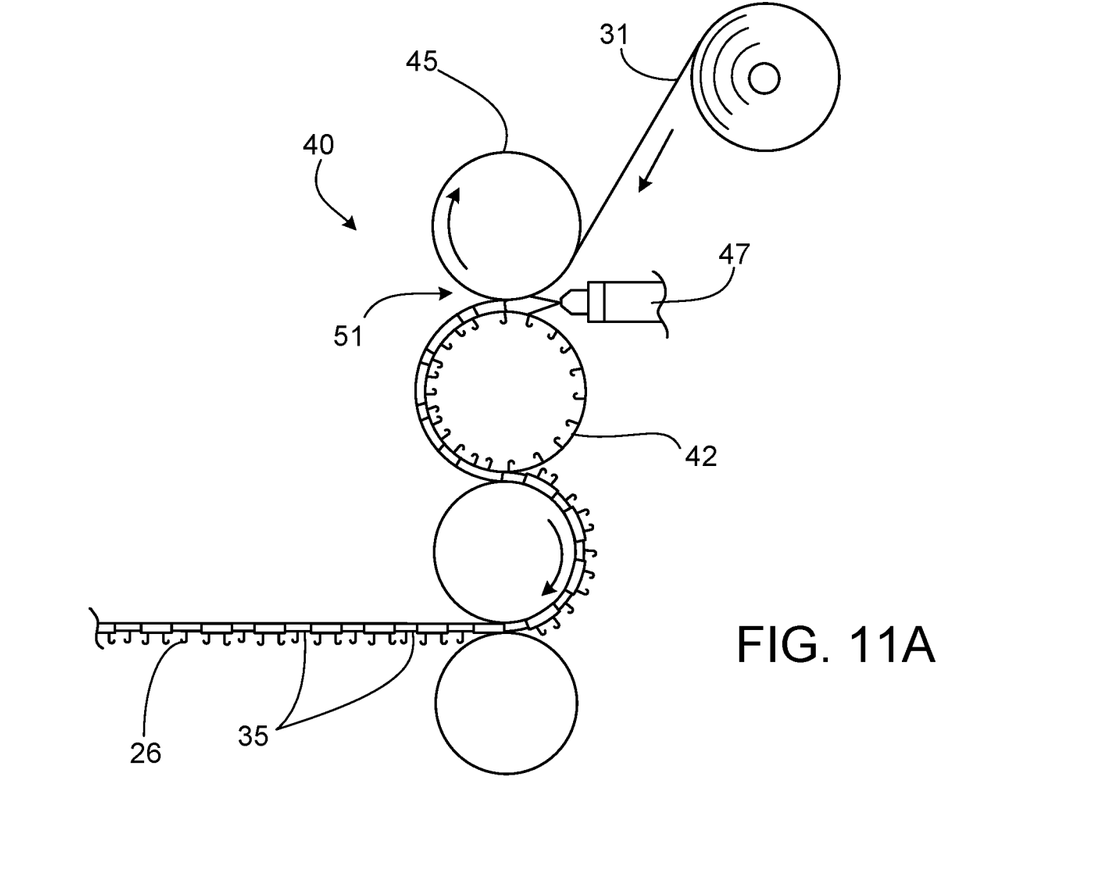
FIG. 11A is a schematic view of an apparatus and method for forming regions of resin on a flexible substrate.
Figure 11B:
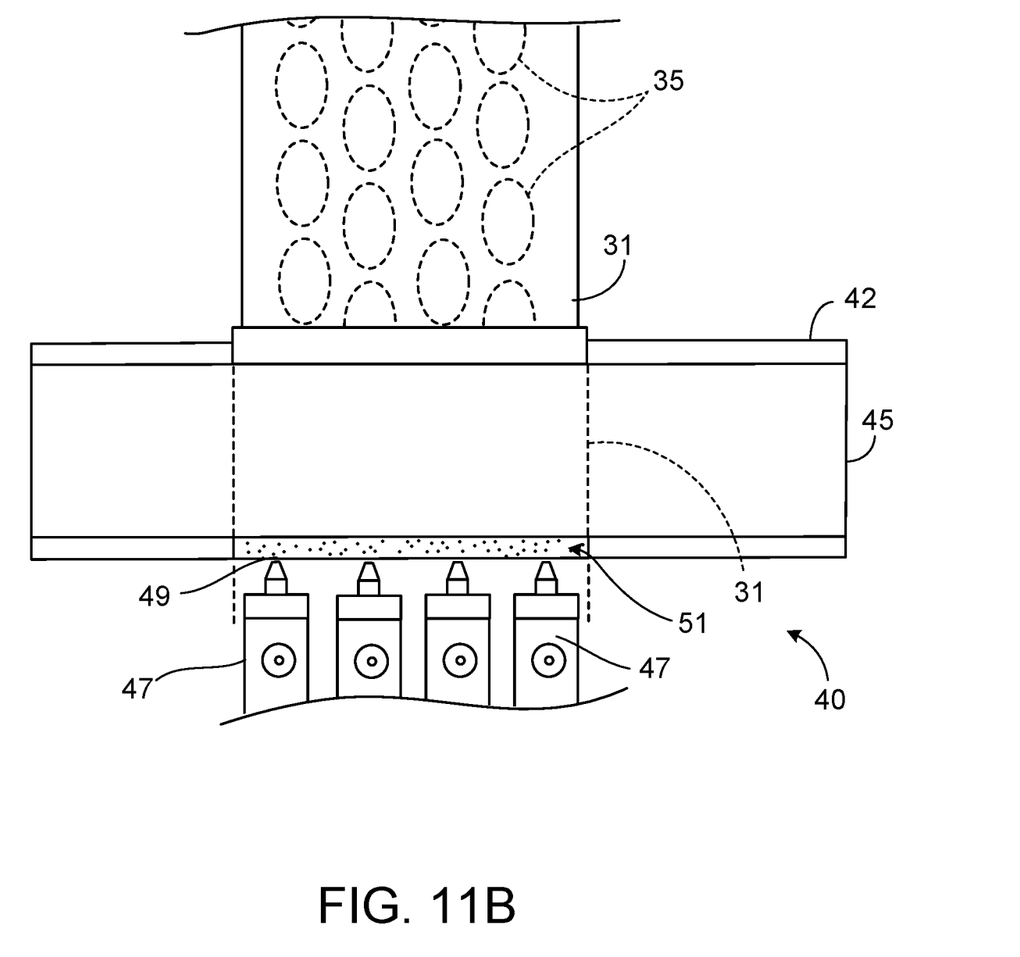
FIG. 11B is a top view of a portion of the apparatus of FIG. 11A, showing the arrangement of resin dispensers.

Referring to FIGS. 11A and 11B, an apparatus 40 and process for forming the wound products of FIGS. 7 and 9 features a mold roll 42 and multiple resin dispensers 47 spaced apart along a cross-machine direction of the substrate 31. Dispensers 47 introduce resin into a molding nip 51 formed between a pressure roll 45 and mold roll 42. As shown in FIG. 11B, apparatus 40 may include four dispensers 47 disposed on a common horizontal plane (not shown) and adjacent to one another to form four columns of resin islands 35 (or four continuous lanes, as the case may be). Each dispenser 47 has a nozzle 49 that operates on a different point across the width of substrate 31. To form islands, each dispenser 47 introduces an interrupted stream of molten resin into molding nip 51 between substrate 31 and mold roll 41, which then is forced into cavities of the mold roll while leaving a resin base on substrate 31 to form the oval-shaped islands. To form staggered islands 35 on substrate 31 as shown in FIG. 11B, two pairs of alternate dispenses (e.g., two dispensers separated by a dispenser in between) repeatedly alternate to introduce resin. For example, a first pair of alternate dispensers first introduces short resin streams at the same time to form two separated islands 35, and then the other two alternate dispensers introduce short resin streams to form two islands that are staggered with respect to the two previously formed islands.

As resin is molded into the cavities of mold roll 42 and it begins to solidify on the surface of the mold roll, the resin opposite the mold cavities is mechanically secured to the substrate 31 by portions of the resin encapsulating surface features of the substrate. To make parallel resin lanes, all the dispensers 47 can be controlled to introduce continuous streams of molten resin at the same time.

Substrate 31 can be a non-woven material, such as a 35 GSM point bonded Spunbond-Meltblown-Spunbond (SMS). In some cases, substrate 31 is a fiberglass-reinforced Kraft paper. Tow substrates 31 that have a width of about 24 inches (60.96 cm) can be laminated to a foam board that has a width of about 48 inches (121.92 cm). In some cases, resin can include 48% PP, 28% CaCO3, 4% LLDPE, and +20% Vistamax. The dispenser can be an AG-900+ modular dispensing applicator from Nordson.

Figure 11C:
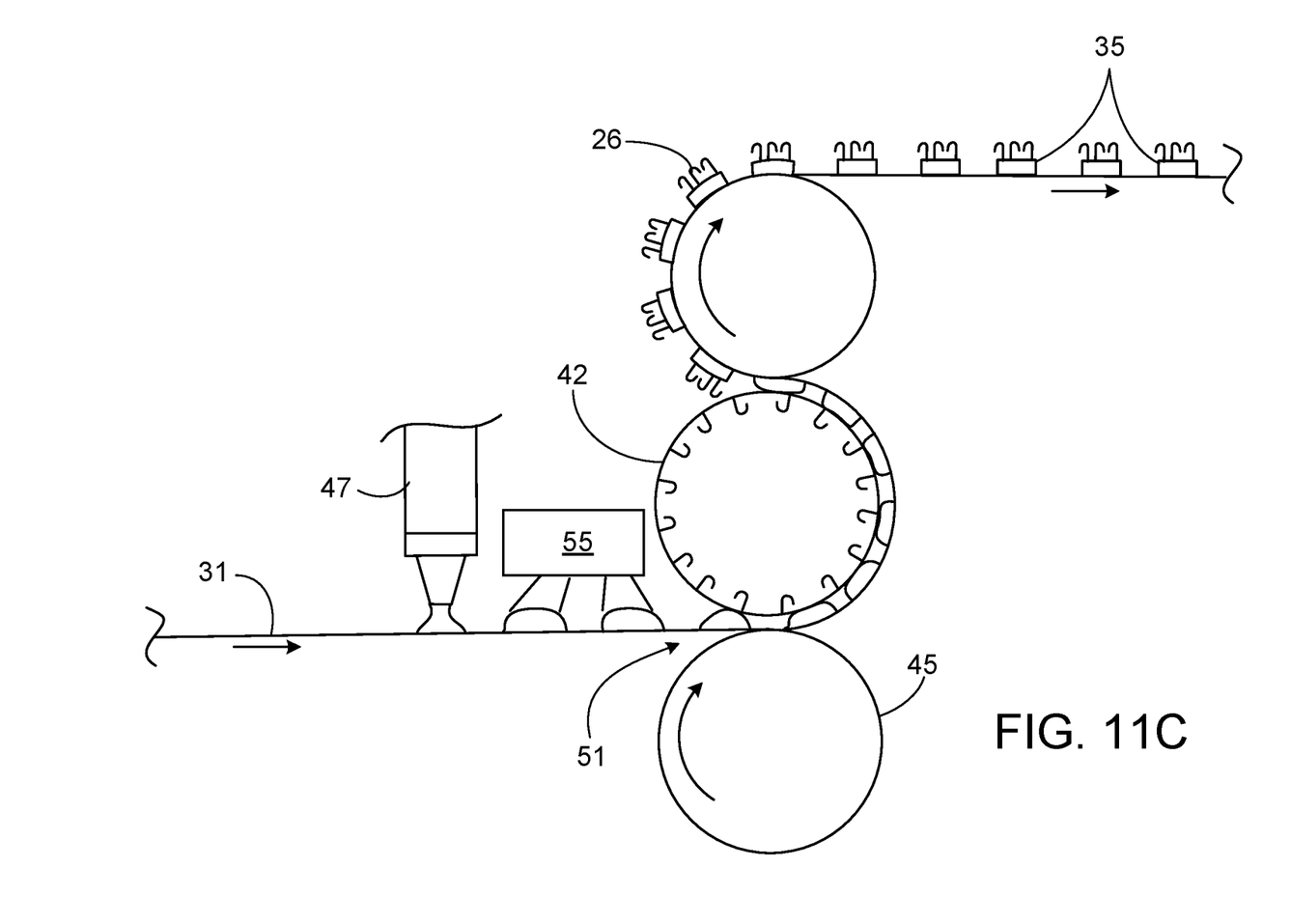
FIG. 11C is a schematic view of an apparatus and method for forming regions of resin on a flexible substrate according to a different implementation.

Alternatively, the resin regions can be formed as illustrated in FIG. 11C. One or more dispensers 47 facing down toward substrate 31 drop dots of resin (or parallel continuous streams to form lanes) that are then passed through molding nip 51 to force upper portions of the molten resin into the small hook-shaped cavities of the mold roll 41. As the resin is molded under pressure in nip 51, fastener elements 26 extending from islands 35 are formed. A heater 55 can be placed over the resin dots near the mold roll to keep the resin surfaces molten as they enter the pressure nip.

Alternatively, each resin island can be bonded to the substrate 31 by an adhesive layer between the resin and the substrate. For example, substrate 31 may include an adhesive layer on a side exposed to the molten resin, or an additional adhesive layer (e.g., a tie layer) may be introduced to the nip 51 between substrate 31 and the molten resin. In some cases, instead of using the process shown in FIG. 11A, a continuous sheet of resin can be molded to substrate 31 and then kiss cut into islands with a rotary die, for example, to then pull back a waste matrix to leave the islands on the substrate 31. In some examples, preformed hook dots (or lanes) can be placed on substrate 31 by using adhesives and/or ultrasonic bonding to adhere the dots to the substrate and form the resin islands.

Figure 12:
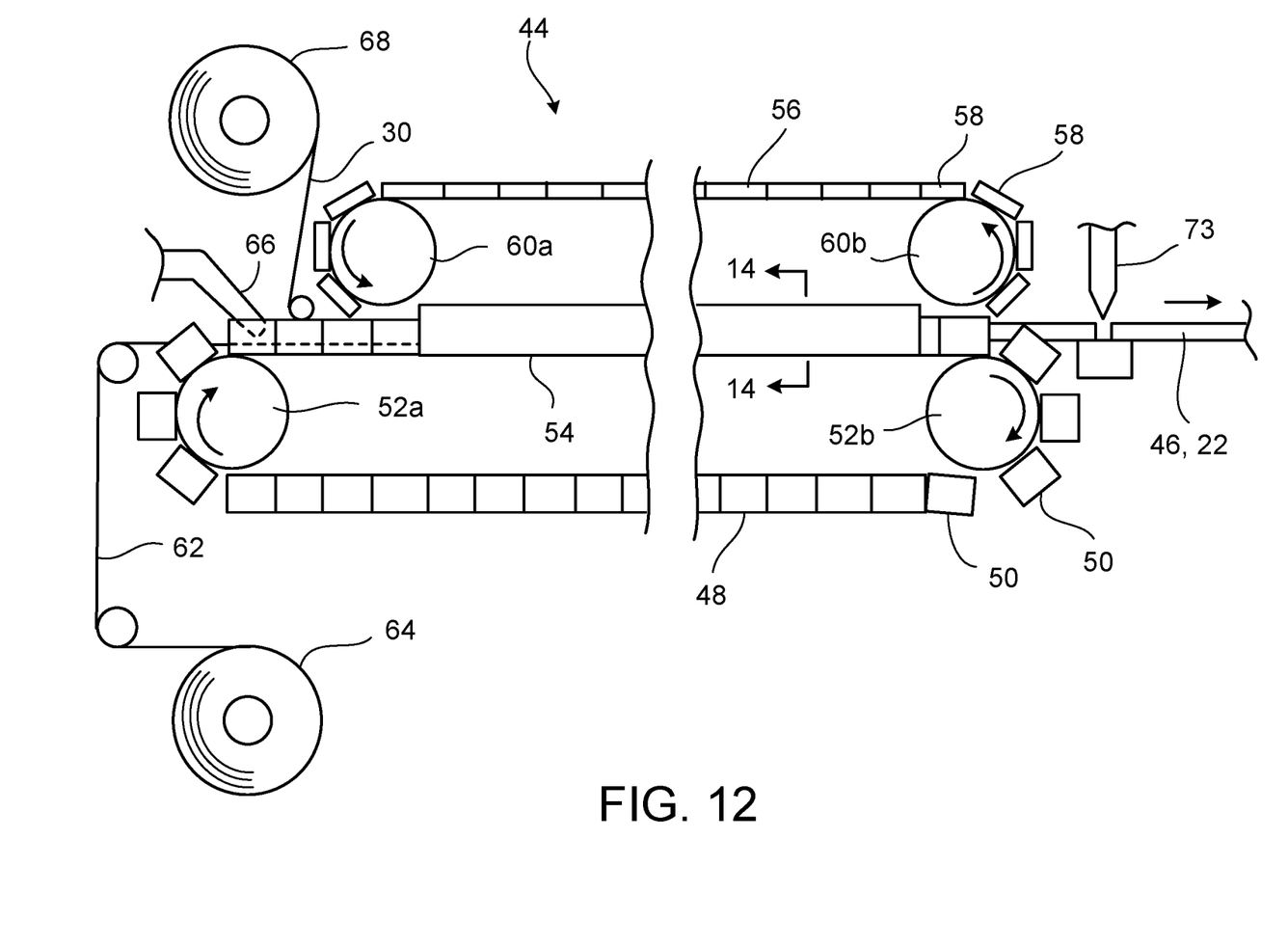
FIG. 12 illustrates an apparatus and method for forming reinforced construction underlayment boards.
Figure 14:
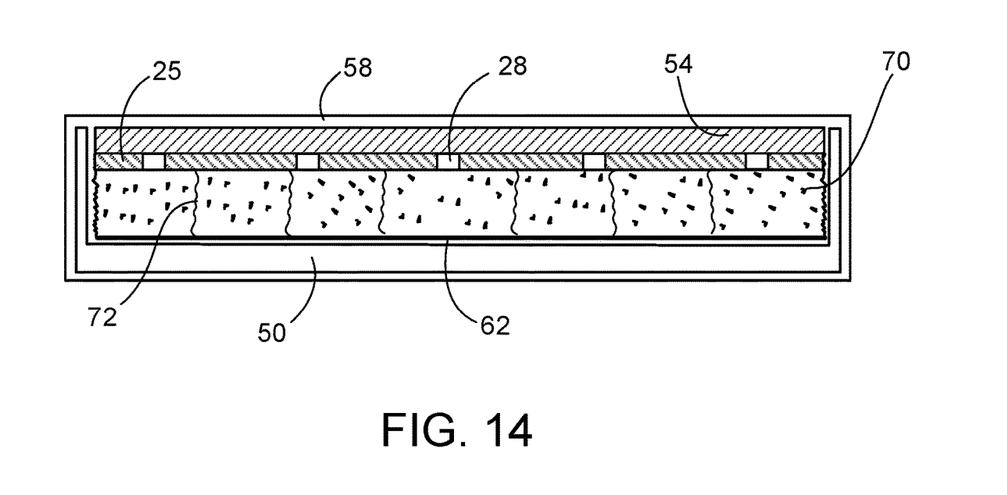
FIG. 14 is a cross-sectional view taken along line 14-14 in FIG. 12.

Referring next to FIGS. 12 and 14, an apparatus 44 for producing faced foam boards 46, 22 includes an articulated, segmented chain 48 of U-shaped lower channel segments 50 driven about two rollers 52a and 52b. Chain 48 is configured such that end surfaces of adjacent segments 50 meet and are held together during the straight run of chain 48 that passes through heater 54, in which chain 48 forms a moving U-shaped channel. An upper chain 56 of flat plate segments 58 is driven about two rollers 60a and 60b and also moves through heater 54 with end surfaces of plate segments 58 held together to form a moving continuous plate. As the segments of the two moving chains are brought together prior to entering heater 54, plate segments 58 of the upper chain nest within channel segments 50 of the lower chain, such that the moving segmented chains define a moving channel within heater 54, as shown in FIG. 14. The side edges of plate segments 58 may seal against the inner surfaces of channel segments 50, or may have a small running clearance. Within heater 54, the moving chain segments are restrained against vertical separation by inside surfaces of the heater housing.

Figure 13:
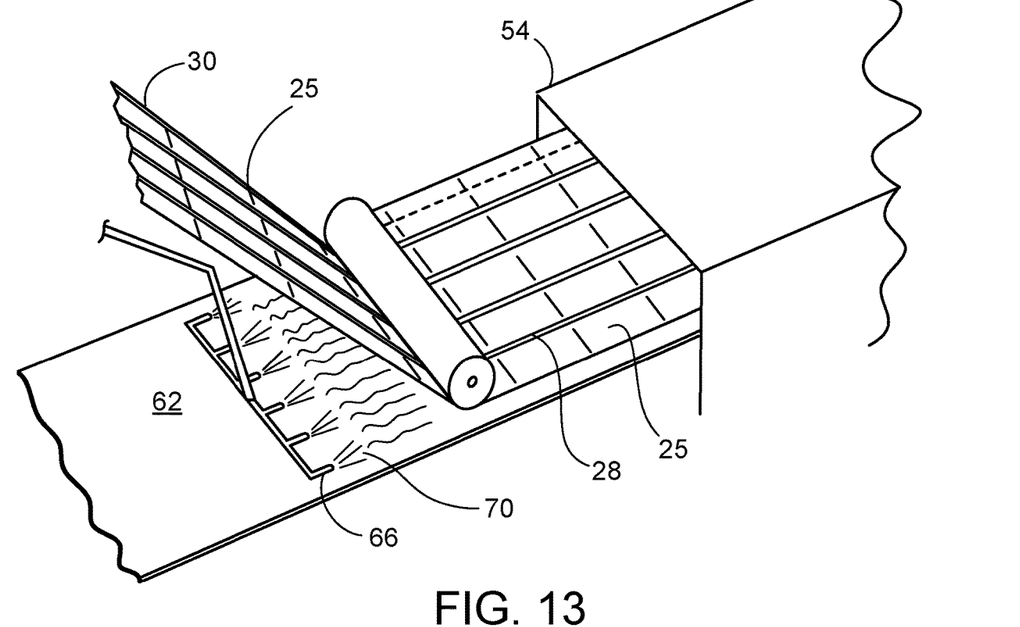
FIG. 13 is a perspective view of the portion of the apparatus of FIG. 12 preceding the heater entrance, showing the application of foaming resin, but with the moving chain segments removed for clarity.

Still referring to FIG. 12, a continuous sheet of facing material 62 (such as the paper skin or carrier sheet 32 of FIG. 5) is introduced from roll 64 to the moving channel, disposed against and substantially covering the lower inner surface of channel segments 50. Onto this facing material, a liquid foaming resin is sprayed by nozzle 66, distributed across the width of the facing material. The foaming resin 70 may be applied with multiple individual nozzle heads, as shown in FIG. 13. The liquid resin 70 can be introduced as parallel lanes of resin that expand to form a single contiguous foam structure. Above the sprayed foaming resin, facing 30 carrying the resin lanes 25 is introduced to the forming channel as a continuous length from roll 68, to become a reinforcing facing on the resulting product. A method of continuously producing an insulation board is disclosed in U.S. Pat. No. 4,572,865, which is incorporated herein in its entirety by reference.

As supplied to the channel, resin lanes 25 (or resin dots, as shown in FIG. 9) may already be laminated, either adhesively or directly, to a reinforcing substrate or barrier material, such as a paper, fabric, film or foil backing. Lanes 25 are provided with molded male touch fastener elements (not shown in these views) extending from their upper surfaces, away from the foaming resin. Alternatively, a reinforcing facing of woven or knit or otherwise formed touch fastener material may be used. In reinforcing backings with layers having discrete fibers, such fibers may be selectively oriented to extend in directions corresponding to forces induced by roof loading, particularly with respect to fastening bolt locations.

As shown in FIG. 14, as the materials progress through heater 54, foaming resin 70 expands to essentially fill the channel, pressing resin lanes 25 up against segments 58 and bonding to the facing materials. The liquid foaming resin can contain a foaming agent that cause the liquid resin to foam to expand within the molding channel so that the facing bonds to the foaming resin 70. The inner surfaces of the moving channel segments may be treated or coated so as to inhibit foam adhesion to the channels. As the resin foams and expands in thickness, vertical knit lines 72 can form between adjacent flows of resin. These knit lines can extend through the thickness of the foam and form regions of reduced board strength. The substrate or facing material spans multiple knit lines, and resin lanes 25 may be arranged with gaps 28 offset with respect to the knit lines such that the resin lanes overlay the knit lines to reinforce the board against rupture and splitting.

Referring back to FIG. 12, the foamed resin and bonded facing materials exit heater 54 as a continuous, rigid laminate structure that can be severed into discrete boards 46, such as by a blade 73.

In some cases, the molding channel is a substantially closed tube as previously described. In other cases, the molding channel is a substantially open corridor such as a single conveyor belt. Still in other cases, the molding channel is an open faced trench, for example, formed by just the lower portion of the channel illustrated in FIG. 14. Accordingly, the foam can be molded using a free rise process on a single conveyor or open faced trench, or using a restrained rise process as illustrated in FIG. 14.

It can be particularly advantageous to inhibit gas bubble nucleation or growth at the interface between the foaming resin and the facing materials during foaming, as extensive surface bubble growth can weaken the bond between the foam and facing materials. One approach to reducing bubble growth on the back side of the facing materials, such as resin lanes 25, is to make the foam-side of the facing smooth. In this way, foam is less prevented from lateral displacement across the face of the foam as bubbles form, and less likely for incompletely foamed resin to be stagnated. For facing materials having molded resin lanes, the resin base may be provided with a smooth back surface as molded. Alternatively, such smoothness may be provided by coating a facing material having a non-smooth (e.g., knit or woven fabric) base with a layer of resin or by laminating such a base to a smooth film. Coatings may be employed that enhance bonding strength to the foamed resin. Another approach to reducing bubble growth is to provide the back surface of the facing material with surface features, such as small exposed fibers, that inhibit contiguous bubble growth beyond a certain size. Yet another approach is to provide the base of the facing material with small holes or perforations (not shown), or a porosity, that vents forming gases through the facing material without allowing the foaming resin to pass completely through the facing materials in quantities that would foul the exposed fastening elements.

In some cases, when an adhesive layer (e.g., a tie layer) is used (shown in FIG. 5) between the resin lanes and the foaming resin to adhere the lanes to the foam, gaseous plasma treatment can be used to increase a surface energy of the resin (e.g., polypropylene) lanes to bond to the adhesive. The tie layer can be a layer of resin that softens during foaming of the liquid resin, and then solidifies as the foamed resin solidifies. In examples in which the substrate is porous, introducing liquid resin causes the introduced resin to flow into pores of the substrate to then solidify and bond to the substrate.

While a number of examples have been described for illustration purposes, the foregoing description is not intended to limit the scope of the invention, which is defined by the scope of the appended claims. There are and will be other examples and modifications within the scope of the following claims.

What is claimed is:

1. A construction underlayment comprising
a rigid foam board having two broadest sides defining a thickness therebetween; and
a facing comprising a flexible substrate bonded across one of the broadest board sides and carrying a series of spaced-apart, discrete regions of resin extending away from the foam board, each resin region carrying a respective field of male touch fastener elements extending away from the substrate and exposed for engagement;
wherein each region is a continuous lane of resin, the series of discrete regions comprising parallel lanes of resin defining longitudinally continuous gaps therebetween; and
wherein each lane defines multiple bend points spaced-apart along its length, at which bend points the lane has a lower resistance to bending than at points between the bend points, each bend point defining a groove extending laterally along a width of the lane.

2. The construction underlayment of claim 1, wherein each lane is of lesser thickness at the bend points than between the bend points.

3. The construction underlayment of claim 1, wherein the resin of each region is mechanically secured to the substrate by portions of resin encapsulating surface features of the substrate.

4. The construction underlayment of claim 1, wherein the resin of each region is bonded to the substrate by an adhesive layer between the resin and the substrate.

5. The construction underlayment of claim 1, wherein the fields of male touch fastener elements carried by the regions together cover between 75 and 99 percent of a total area of the facing.

6. The construction underlayment of claim 5, wherein the fields of male touch fastener elements carried by the regions together cover between 85 and 95 percent of a total area of the facing.

7. The construction underlayment of claim 1, wherein each region comprises a resin base layer and wherein the touch fastener elements of each region have individual resin stems extending integrally from a surface of the resin base layer.

8. The construction underlayment of claim 7, wherein each base layer has an overall thickness, in a direction extending away from the foam board, less than about two percent of an overall thickness of the foam board.

* * * * *

UNITED STATES PATENT AND TRADEMARK OFFICE
CERTIFICATE OF CORRECTION

PATENT NO. : 10,934,716 B2
APPLICATION NO. : 16/132521
DATED : March 2, 2021
INVENTOR(S) : Scott Billings, Paul M. Siemiesz and Andrew Collins Page 1 of 1

It is certified that error appears in the above-identified patent and that said Letters Patent is hereby corrected as shown below:

On the Title Page

Item (54) and in the Specification, Column 1, Line 1, delete "UNDERPAYMENT" and insert
-- UNDERLAYMENT --.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*